(12) United States Patent
Asano

(10) Patent No.: US 8,286,336 B2
(45) Date of Patent: Oct. 16, 2012

(54) LEAD WIRE INSERTION DEVICE

(75) Inventor: Mitsutoshi Asano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 737 days.

(21) Appl. No.: 12/428,210

(22) Filed: Apr. 22, 2009

(65) Prior Publication Data

US 2009/0277001 A1 Nov. 12, 2009

(30) Foreign Application Priority Data

May 12, 2008 (JP) ................. 2008-124658

(51) Int. Cl.
*B23P 19/00* (2006.01)
*H01R 43/00* (2006.01)
(52) U.S. Cl. ................. 29/755; 29/732; 29/735; 29/736
(58) Field of Classification Search .................. 29/755, 29/566.3, 596, 732, 735, 736
See application file for complete search history.

(56) References Cited

U.S. PATENT DOCUMENTS 4,074,418 A * 2/1978 Pearsall ........................ 29/596
5,090,107 A * 2/1992 Beakes et al. ................ 29/566.3

FOREIGN PATENT DOCUMENTS

JP 2003-224955 A 8/2003
JP 2007-215356 A 8/2007

* cited by examiner

*Primary Examiner* — Thiem Phan
(74) *Attorney, Agent, or Firm* — Kenyon & Kenyon LLP

(57) ABSTRACT

A lead wire insertion device includes a first chuck member and a second chuck member, each of which is separable, and connects a coil terminal of a cassette coil to a terminal of a connection terminal. The first chuck member is divided into the first chuck inner member and a first chuck outer member at a first division position that is inside both ends of a cross section of the coil terminal in a lateral direction, and that is offset from a center of the cross section in the lateral direction. The second chuck member is divided into the second chuck inner member and a second chuck outer member at a second division position that is inside the both ends of the cross section of the coil terminal in the lateral direction, and that is offset from a center of the cross section in the lateral direction.

1 Claim, 16 Drawing Sheets

F I G . 18A
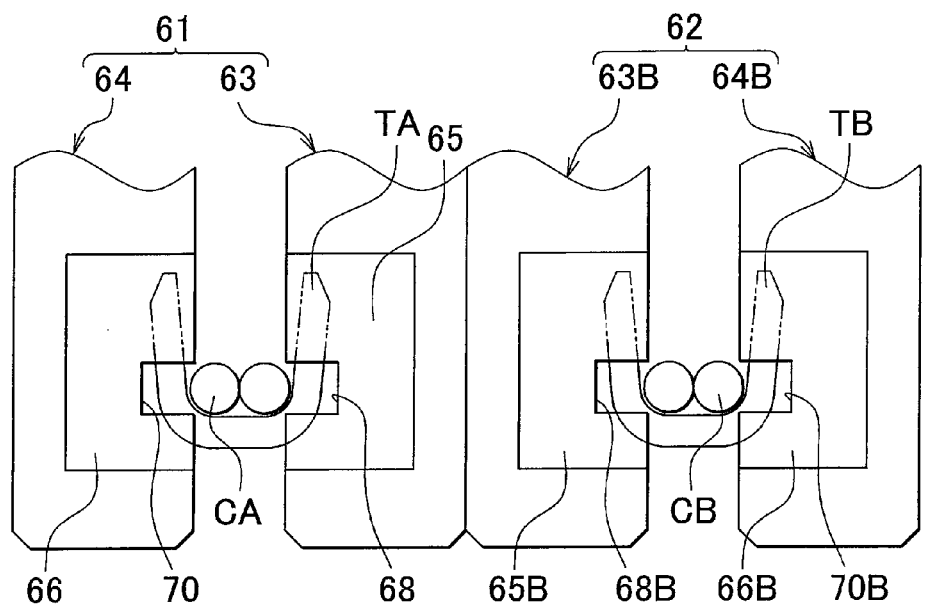
F I G . 18B
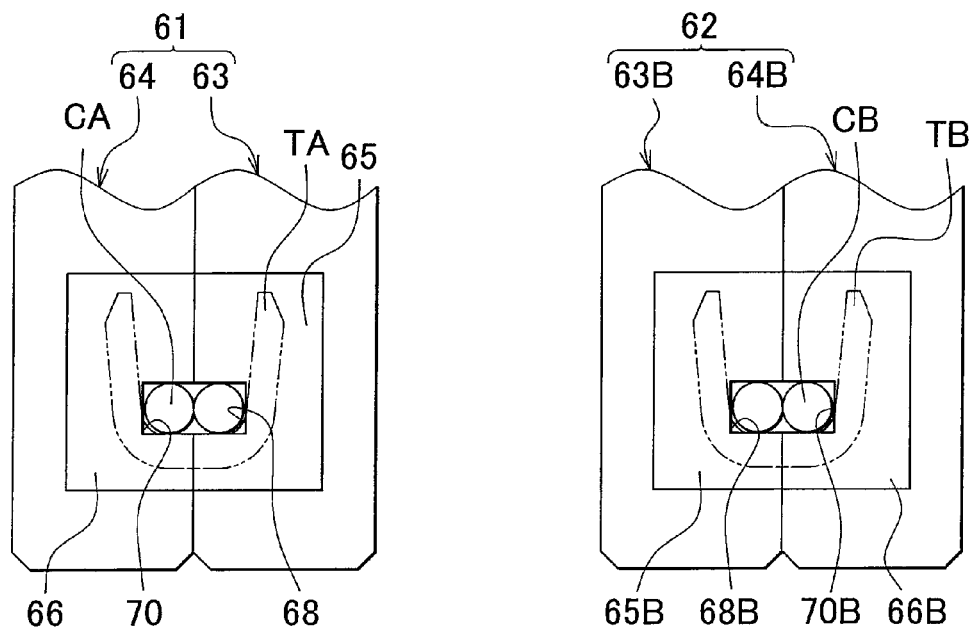

LEAD WIRE INSERTION DEVICE

INCORPORATION BY REFERENCE

The disclosure of Japanese Patent Application No. 2008-124658 filed on May 12, 2008 including the specification, drawings and abstract is incorporated herein by reference in its entirety.

BACKGROUND OF THE INVENTION

1. Field of the Invention

The invention relates to a lead wire insertion device that includes a pair of a first chuck member and a second chuck member, wherein each of the first chuck member and the second chuck member is separable, and connects a coil terminal of a cassette coil to a terminal of a connection terminal, and a first chuck inner member is adjacent to a second chuck inner member.

2. Description of the Related Art

Japanese Patent Application Publication No. 2007-215356 (JP-A-2007-215356) describes a lead wire insertion device. FIG. 17 shows the lead wire insertion device described in the publication No. 2007-215356. In FIG. 17, for example, a coil is used as a lead wire. A motor production device 100, which is the lead wire insertion device, is used to fit a plurality of cassette coils 69, in each of which a coil is wounded, to a connection terminal, and to insert coil terminals CA and CB of each cassette coil 69 into terminals TA and TB of the connection terminal, respectively. The motor production device 100 includes a first chuck member 61 and a second chuck member 62, each of which is separable. The first chuck member 61 and the second chuck member 62 are used to guide the coil terminals CA and CB into the terminals TA and TB, respectively. FIGS. 16A and 16B show the first chuck member 61, the second chuck member 62, the terminals TA and TB, and the coil terminals CA and CB, which are extracted from FIG. 17. FIG. 18A is a front view showing the first chuck member 61 and the second chuck member 62 in FIG. 16A. FIG. 18B is a front view showing the first chuck member 61 and the second chuck member 62 in FIG. 16B. Guide portions 65 and 66, which are symmetric to each other, are formed in the first chuck member 61. Guide portions 65B and 66B, which are symmetric to each other, are formed in the second chuck member 62. Insertion holes 68 and 70, which are symmetric to each other, are formed in the first chuck member 61. Insertion holes 68B and 70B, which are symmetric to each other, are formed in the second chuck member 62.

The first chuck member 61 and the second chuck member 62 are moved downward to the positions of the terminals TA and TB, while a first chuck inner member 63 and a first chuck outer member 64 are apart from each other, and a second chuck inner member 63B and a second chuck outer member 64B are apart from each other, as shown in FIGS. 16A and 18A. There is a predetermined distance between the first chuck inner member 63 and the first chuck outer member 64, and between the second chuck inner member 63B and the second chuck outer member 64B. Therefore, the first chuck inner member 63 and the first chuck outer member 64 do not hit the terminal TA, and thus, do not deform the terminal TA. The second chuck inner member 63B and the second chuck outer member 64B do not hit the terminal TB, and thus, do not deform the terminal TB. Next, the terminal TA is sandwiched between the first chuck inner member 63 and the first chuck outer member 64, and the terminal TB is sandwiched between the second chuck inner member 63B and the second chuck outer member 64B as shown in FIG. 16B and FIG. 18B, and the first chuck member 61 and the second chuck member 62 are stopped. Thus, both of the first chuck member 61 and the second chuck member 62 are positioned with respect to the terminals TA and TB, respectively. By moving the cassette coil 69 toward the terminals TA and TB, the coil terminal CA of the cassette coil 69 is guided by the guide portions 65 and 66, and inserted into the terminal TA, and the coil terminal CB of the cassette coil 69 is guided by the guide portions 65B and 66B, and inserted into the terminal TB. After the coil terminals CA and CB are inserted into the terminals TA and TB, respectively, the first chuck inner member 63 and the first chuck outer member 64 of the first chuck member 61 are moved away from each other, and the second chuck inner member 63B and the second chuck outer member 64B of the second chuck member 62 are moved away from each other. That is, the terminals TA and TB are released from the first chuck member 61 and the second chuck member 62, respectively. Then, the first chuck member 61 and the second chuck member 62 are moved upward. Thus, a series of the operations end.

Recently, the size of a motor has been reduced, and accordingly, the size of the cassette coil has been reduced, and the distance between the coil terminals CA and CB has been reduced. Therefore, in the lead wire insertion device in the related art, when the distance between the coil terminals CA and CB is short, a sufficient chuck stroke cannot be ensured, that is, each of the first chuck inner member 63 and the second chuck inner member 63B cannot be sufficiently moved. Accordingly, there is a high possibility that the lead wires cannot be appropriately inserted into the terminals TA and TB. More specifically, if the distance between the coil terminals CA and CB of the cassette coil 69 is long as shown in FIGS. 15A and 15B, the first chuck inner member 63 and the second chuck inner member 63B do not interfere with each other. Thus, a sufficient chuck stroke is ensured, that is, each of the first chuck inner member 63 and the second chuck inner member 63B can be sufficiently moved. However, if the distance between the coil terminals CA and CB of the cassette coil 69 is short as shown in FIGS. 16A and 16B, or the distance between the coil terminals CA and CB is shorter than the distance shown in FIGS. 16A and 16B, the first chuck inner member 63 and the second chuck inner member 63B interfere with each other, and a sufficient chuck stroke cannot be ensured, that is, each of the first chuck inner member 63 and the second chuck inner member 63B cannot be sufficiently moved. Because the first chuck member 61 and the second chuck member 62 are symmetric, if the distance between the coil terminals CA and CB is short, the stroke of the first chuck inner member 63 and the stroke of the second chuck inner member 63B are limited.

In a lead wire insertion device shown in FIGS. 14A and 14B, no recessed portion is formed in a first chuck inner member 71 of a first chuck member 70, and a large recessed portion 73 is formed in a first chuck outer member 71 of the first chuck member 70 so that two coil wires of the coil terminal CA can be inserted into the recessed portion 73. Because the second chuck member is symmetric to the first chuck member 70, the description of the second chuck member is omitted. In the first chuck member 70 shown in FIGS. 14A and 14B, because no recessed portion is formed in the first chuck inner member 71, when the terminal is released from the first chuck member 70, the first chuck inner member 71 does not need to be moved. That is, the first chuck inner member 71 and a second chuck inner member 71B do not need to be moved. Therefore, it is possible to make the first chuck inner member 71 and the second chuck inner member 71B closer to each other.

However, a gap 74 may be formed when the first chuck inner member 71 is made close to the first chuck outer member 72, in some cases. A pointed portion may be formed in the cut surface of the coil terminal CA when the coil terminal CA is cut. When the coil terminal CA is guided by the guide portion 75, and inserted into the terminal TA, the pointed portion of the coil terminal CA may be guided into the gap 74, and therefore, interference between the pointed portion and the terminal TA may occur. In this case, the coil terminal CA cannot be smoothly inserted into the terminal TA. When no recessed portion is formed in the first chuck inner member 71, the first chuck inner member 71 may be made thin. However, in this case, the strength of the first chuck inner member 71 is made low. Therefore, the first chuck inner member 71 may be deformed due to some trouble. Even if the chuck member is deformed only slightly, the coil terminal CA cannot be appropriately guided.

SUMMARY OF THE INVENTION

The invention provides a lead wire insertion device which appropriately inserts coil terminals into terminals, and in which strokes of chuck members are not limited, even when a small motor, in which a distance between the coil terminals is short, is manufactured.

An aspect of the invention relates to a lead wire insertion device that includes a pair of a first chuck member and a second chuck member, each of which is separable, and connects a coil terminal of a cassette coil to a terminal of a connection terminal. The first chuck member is divided into a first chuck inner member and a first chuck outer member at a first division position, the first division position is inside both ends of a cross section of the coil terminal in a lateral direction of the first chuck member (i.e., the first division position is closer to the second chuck member than the outer end of the cross section is), and the first division position is offset from a center of the cross section of the coil terminal in the lateral direction of the first chuck member. The second chuck member is divided into a second chuck inner member and a second chuck outer member at a second division position, the second division position is inside the both ends of the cross section of the coil terminal in a lateral direction of the second chuck member (i.e., the second division position is closer to the first chuck member than the outer end of the cross section is), and the second division position is offset from a center of the cross section of the coil terminal in the lateral direction of the second chuck member. The first chuck inner member is adjacent to the second chuck inner member.

Each of the first chuck member and the second chuck member includes a pair of the inner member and the outer member. Thus, the four chuck members are arranged in a line. The first chuck inner member is closer to the second chuck member than the first chuck outer member is. The second chuck inner member is closer to the first chuck member than the second chuck outer member is.

In the lead wire insertion device according to the above-described aspect, an upper portion of the first chuck inner member may be separated from an upper portion of the first chuck outer member at a first upper division position, and the first upper division position may be outwardly offset from the center of the cross section (i.e., the first upper division position may be offset from the center of the cross section toward a side opposite to the second chuck member) in the lateral direction of the first chuck member. An upper portion of the second chuck inner member may be separated from an upper portion of the second chuck outer member at a second upper division position, and the second upper division position may be outwardly offset from the center of the cross section (i.e., the second upper division position may be offset from the center of the cross section toward a side opposite to the first chuck member) in the lateral direction of the second chuck member. The upper portion of the chuck inner member and the upper portion of the chuck outer member are closer to a root than the lower portion of the chuck inner member and the lower portion of the chuck outer member.

When each chuck member is opened, the chuck member is divided into the chuck inner member and the chuck outer member at the division position, the division position is inside both ends of the cross section of the coil terminal in the lateral direction of the chuck member, and the division position is offset from the center of the cross section of the coil terminal in the lateral direction of the chuck member. Therefore, even when the distance between the coil terminals is short, the stroke of the first chuck inner member of the first chuck member and the stroke of the second chuck inner member of the second chuck member are not limited, and thus, a sufficient chuck stroke is ensured. That is, the first chuck inner member and the second chuck inner member can be sufficiently moved. In other words, even when the distance between the coil terminals is short, it is possible to reduce the possibility that an adverse effect is caused due to the limitation of the stroke of the first chuck inner member and the stroke of the second chuck inner member. An elliptical insertion hole, in which the coil terminal can be inserted, is formed when the first chuck inner member and the first chuck outer member are close to each other. The edge of the lower portion of the insertion hole extends along the shape of the terminal. Therefore, a gap is not formed between the edge of the lower portion of the insertion hole and the edge of the terminal. This avoids the situation where the coil terminal is guided into a gap and interference between the coil terminal and the terminal occurs. Thus, when the coil terminal is inserted, interference between the coil terminal and the terminal does not occur. Accordingly, it is possible to smoothly insert the coil terminal into the terminal.

The upper portion of the first chuck inner member is separated from the upper portion of the first chuck outer member at the first upper division position, and the first upper division position is outwardly offset from the center of the cross section of the coil terminal in the lateral direction of the first chuck member. The upper portion of the second chuck inner member is separated from the upper portion of the second chuck outer member at the second upper division position, and the second upper division position is outwardly offset from the center of the cross section of the coil terminal in the lateral direction of the second chuck member. Therefore, each of the first chuck inner member and the second chuck inner member has sufficient strength, while a sufficient chuck stroke is ensured. This reduces the possibility that the coil terminal cannot be appropriately guided due to the deformation of the chuck inner member.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 18A and 18B are front views each showing the first chuck member and the second chuck member in FIGS. 16A and 16B.

DETAILED DESCRIPTION OF EMBODIMENTS

Figure 12:
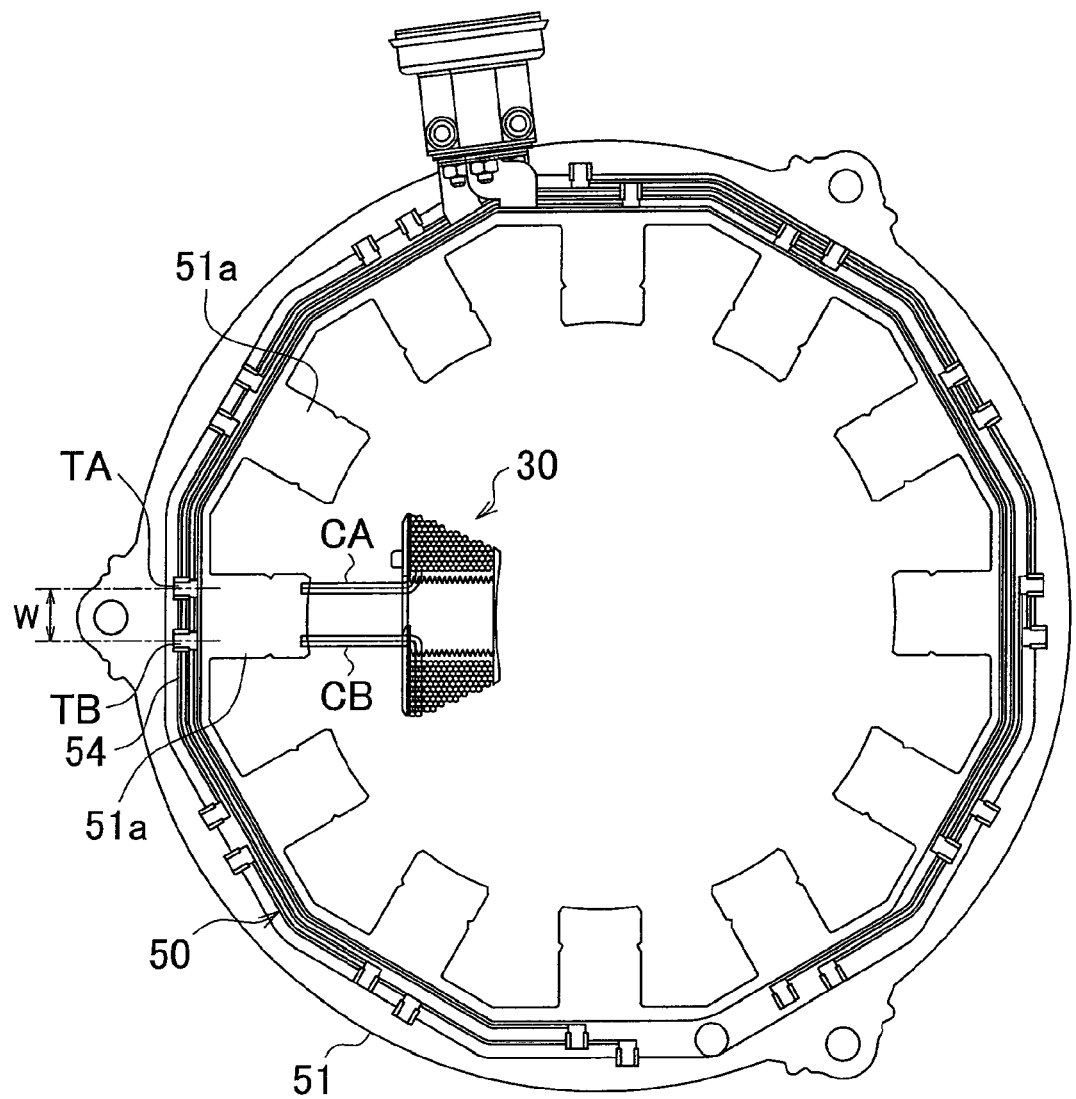
FIG. 12 is a plane view showing an entire configuration where a connection terminal is placed on an upper surface of a core before cassette coils are fitted to the connection terminal, in the embodiment of the invention.

Hereinafter, a method of producing a motor according to an embodiment of the invention will be described in detail with reference to the drawings. FIG. 12 is a plane view showing an entire configuration where a connection terminal 50 is placed on an upper surface of a core 51 before cassette coils are fitted to the connection terminal 50. FIG. 12 also shows a position of one cassette coil to be fitted to the connection terminal 50, in an automatic assembly machine. Twelve coil cores 51a are provided in the core 51. The coil cores 51a are used to position the cassette coils 30 with respect to the connection terminal 50, and to fit the cassette coils 30 to the connection terminal 50. The cassette coil 30 shown in FIG. 12 is trapezoidal. However, the trapezoidal cassette coils 30 and rectangular parallelepiped cassette coils (not shown) are alternatively disposed. The connection terminal 50 has a dodecagon shape, and includes edge portions 54. Paired terminals TA and TB are provided at a center of each edge portion 54 to protrude upward. The distances W between centerlines of the terminals TA and TB at the twelve locations are the same. However, the terminals TA and TB at several locations are slightly offset from each other diametrically. Paired coil terminals CA and CB, which are end portions of coil wires of the cassette coil 30, protrude. Each of the coil terminals CA and CB is constituted by two coil wires. Also, an enamel coating of each of the coil terminals CA and CB has been removed. Although each of the coil terminals CA and CB is constituted by the two coil wires in the embodiment, each of the coil terminals CA and CB may be constituted by one coil wire, or three or more coil wires.

Figure 7:
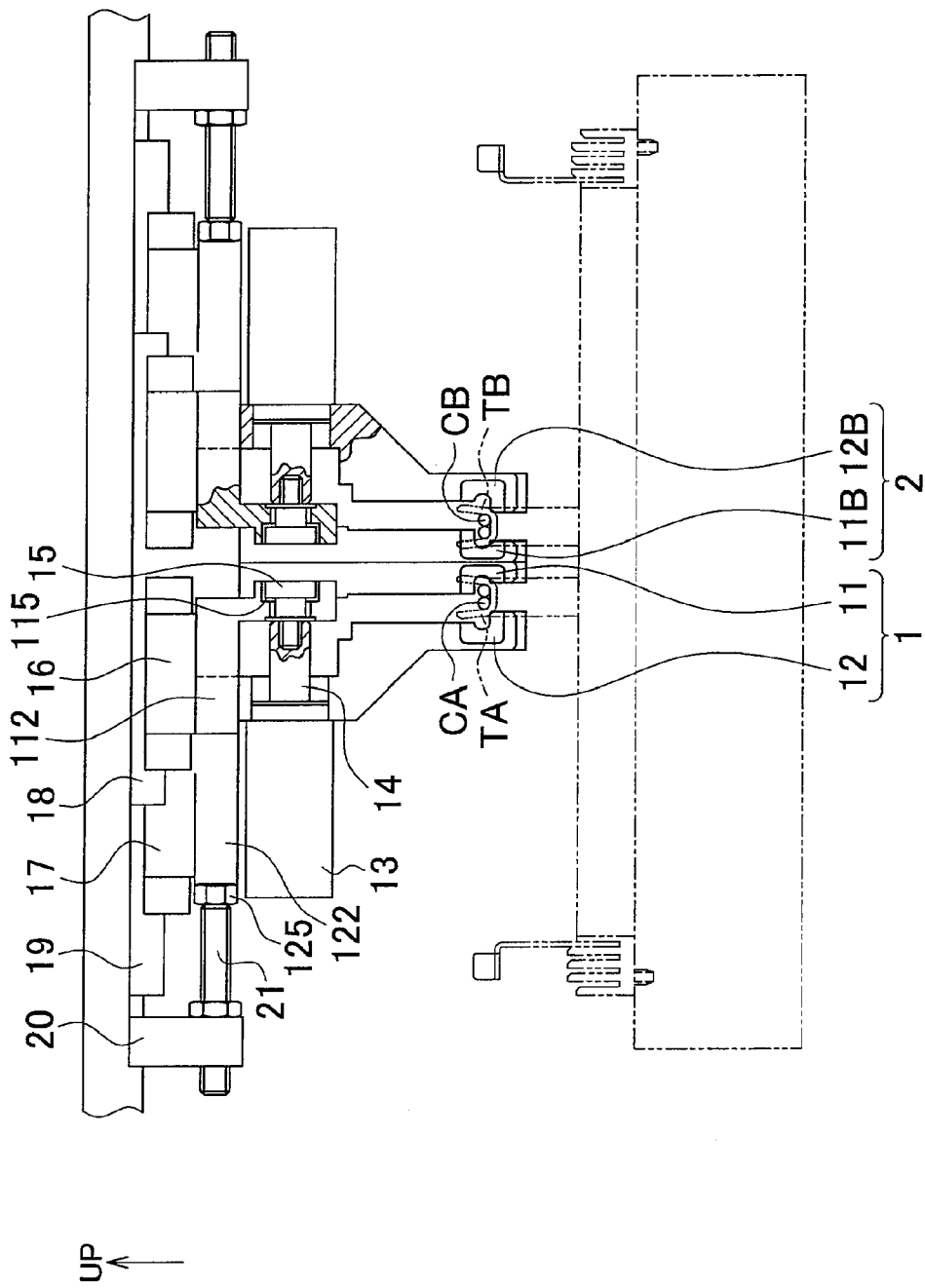
FIG. 7 is a front view showing a chuck device with a guide, in which guide portions are positioned with respect to the terminals according to the embodiment of the invention, when the chuck members are opened.
Figure 8:
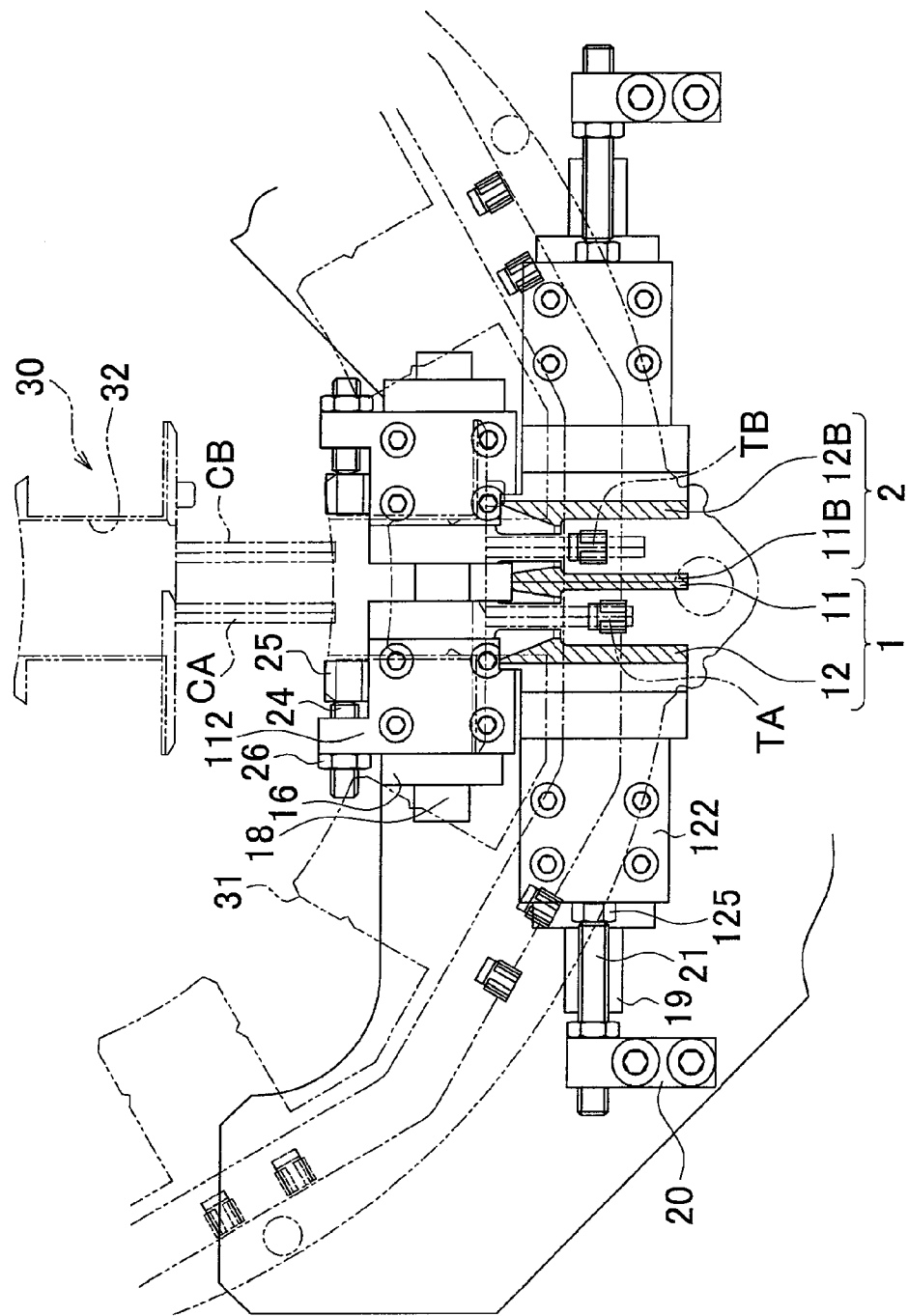
FIG. 8 is a plane view showing the chuck device according to the embodiment of the invention, when the chuck members are opened.
Figure 9:
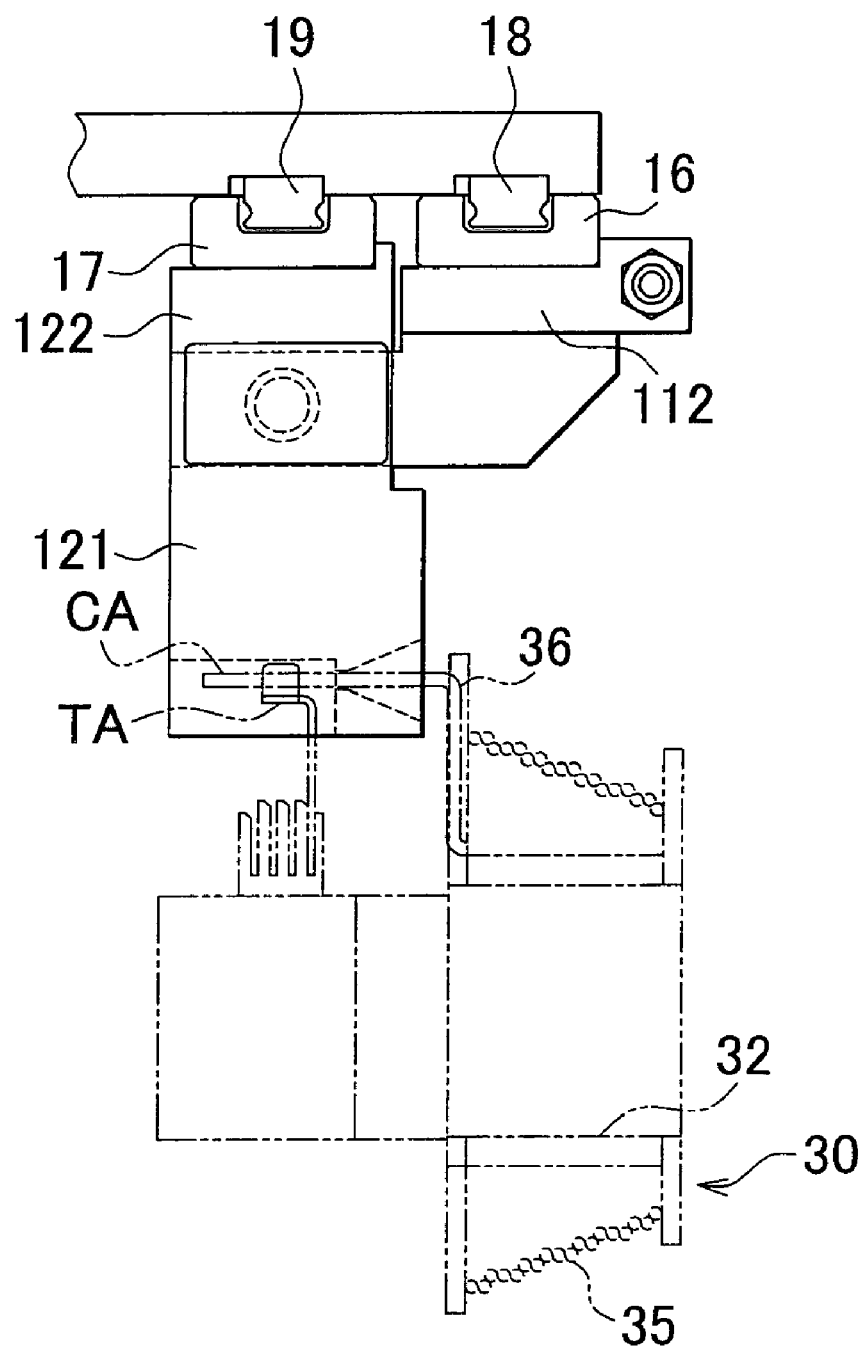
FIG. 9 is a lateral view showing a left portion of the chuck device according to the embodiment of the invention.
Figure 10:
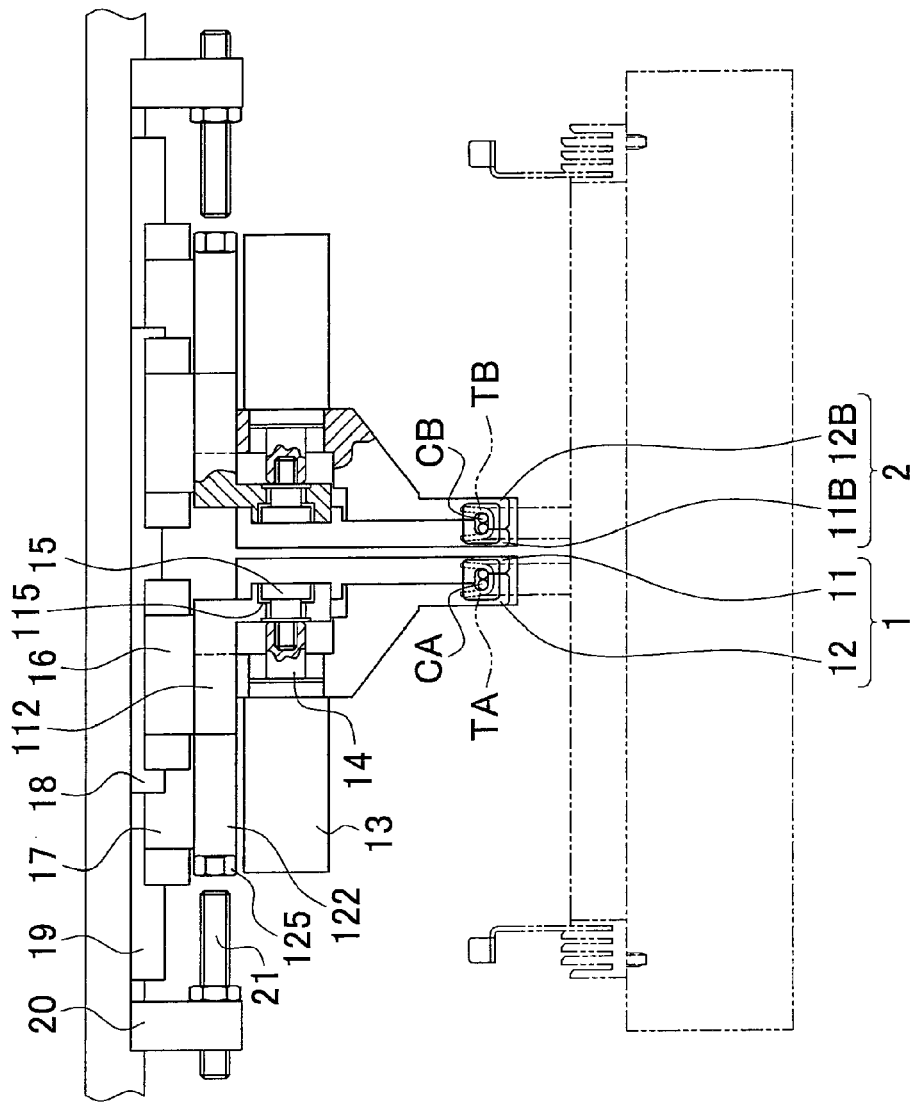
FIG. 10 is a front view showing the chuck device with the guide, in which guide portions are positioned with respect to the terminals according to the embodiment of the invention, when the chuck members are closed.
Figure 11:
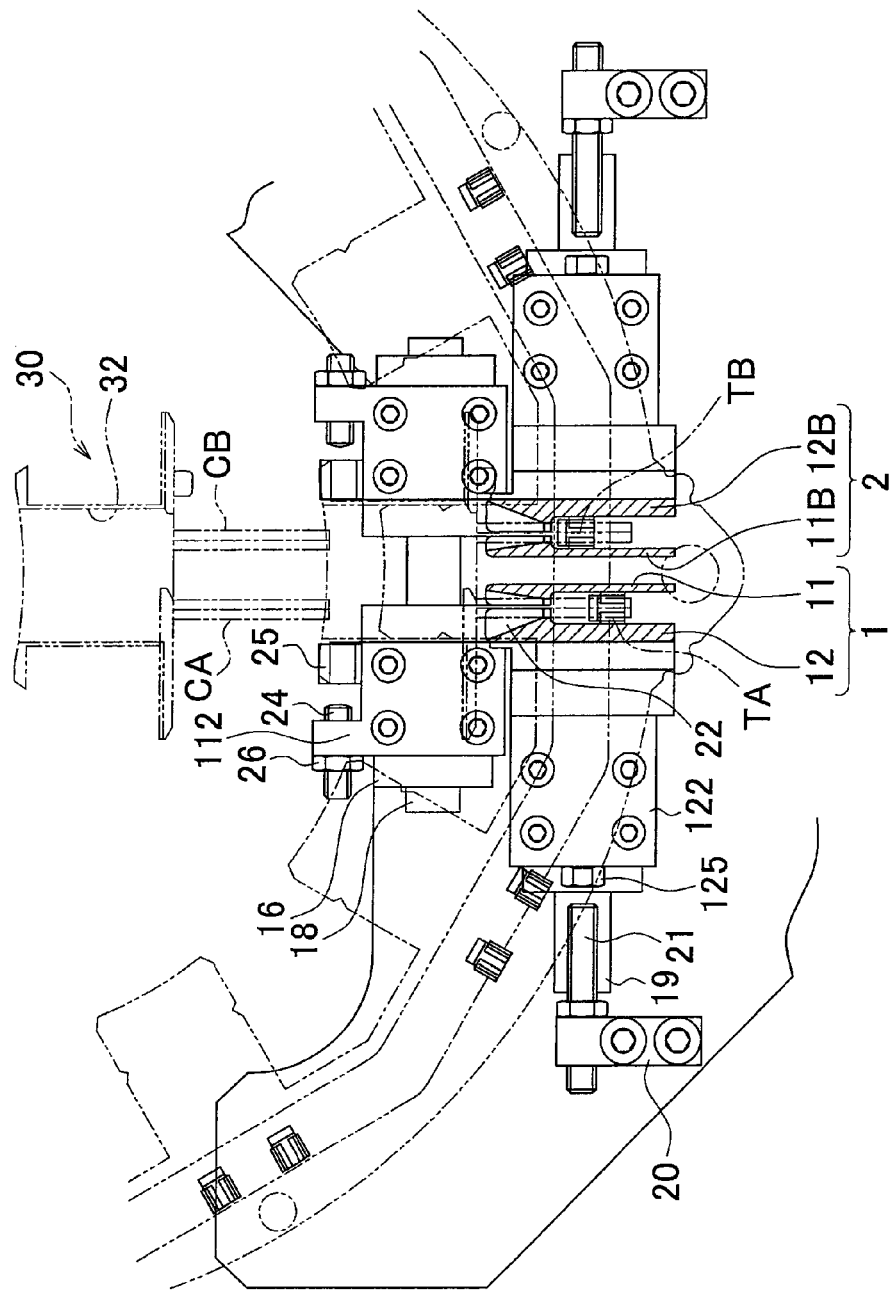
FIG. 11 is a plane view showing the chuck device in FIG. 10.

A device that inserts the paired coil terminals CA and CB of the cassette coil 30 into the paired terminals TA and TB of the connection terminal 50 will be described. FIG. 7 is a front view showing a chuck device with a guide, in which guide portions are positioned with respect to the terminals TA and TB, when chuck members are opened. FIG. 8 is a plane view showing the chuck device when the chuck members are opened. FIG. 10 is a front view showing the chuck device with the guide, in which the guide portions are positioned with respect to the terminals TA and TB. FIG. 11 is a plane view showing the chuck device in FIG. 10. FIG. 9 is a lateral view showing a left portion of the chuck device in FIG. 10. Each of FIG. 9 to FIG. 11 shows the chuck device when the chuck members are closed. As shown in FIG. 10 and FIG. 11, in the chuck device with the guide, a first chuck member 1 is symmetric to a second chuck member 2. This is because a device that positions the coil terminal CA with respect to the terminal TA is symmetric to a device that positions the coil terminal CB with respect to the terminal TB. The chuck device is symmetric, and the right portion and the left portion of the chuck device have the same structure. Therefore, the first chuck member 1, which is positioned on the left side of a centerline in each of FIG. 10 and FIG. 11, will be described, and the description of the second chuck member 2, which is symmetric to the first chuck member 1, and is positioned on the right side, will be omitted. In the figures, main constituent elements in the right portion of the chuck device are denoted by reference numerals assigned to constituent elements in the left side of the chuck device, and a reference character "B" following the reference numerals.

The first chuck member 1 and the second chuck member 2 are fitted to respective sliding members. Thus, the first chuck member 1 and the second chuck member 2 are slidably supported. The first chuck member 1 includes a first chuck inner member 11 and a first chuck outer member 12. As shown in FIG. 7, a first sliding member 16 linearly slides on a first rail 18 fixed to a body of the chuck device. The first chuck inner member 11 is fixed to an end of a rod 14 of an air cylinder 13 using a screw 15. As shown in FIG. 7, a second sliding member 17 linearly slides on a second rail 19 fixed to the body of the chuck device. A body of the air cylinder 13 is fixed to the first chuck outer member 12.

Figure 1:
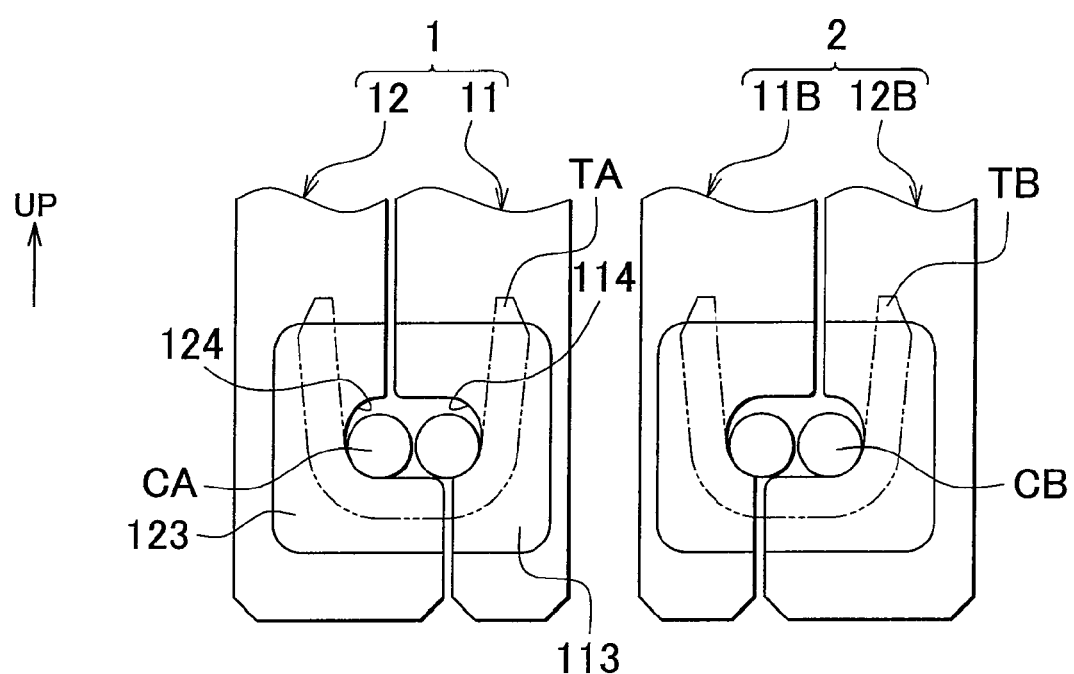
FIG. 1 is a diagram showing a first chuck member, a second chuck member, terminals, and coil terminals according to an embodiment of the invention.
Figure 2:
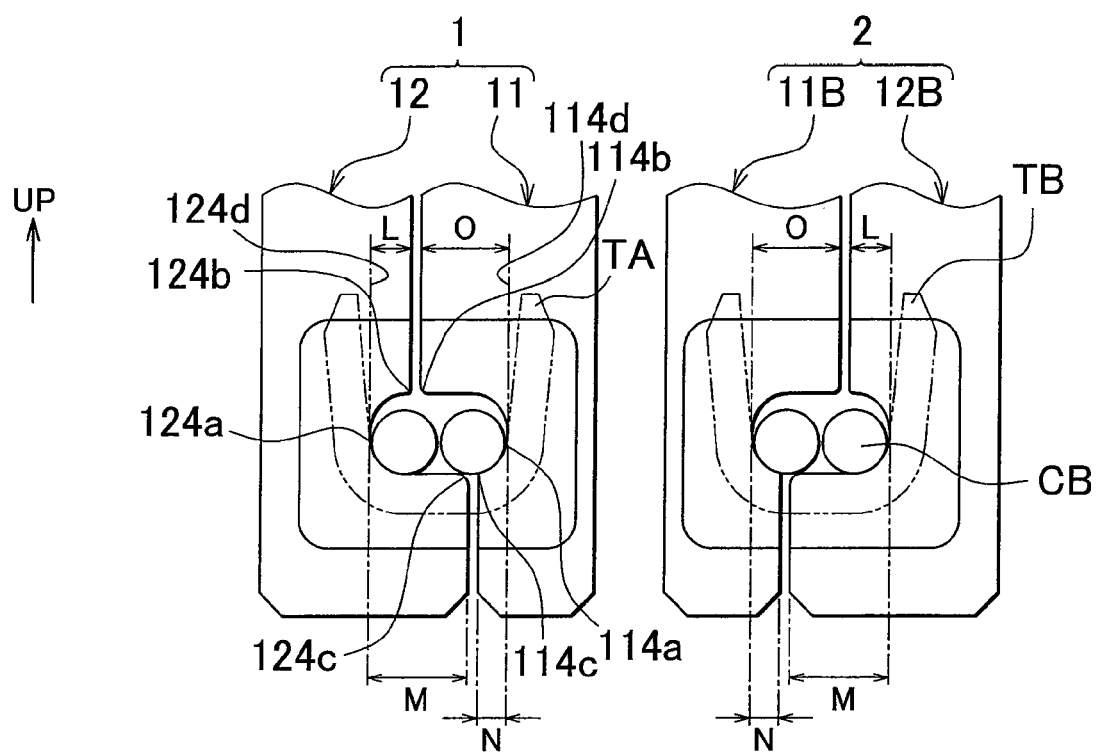
FIG. 2 is a diagram in which only reference numerals required to describe the shapes of insertion holes in FIG. 1 are shown.
Figure 5:
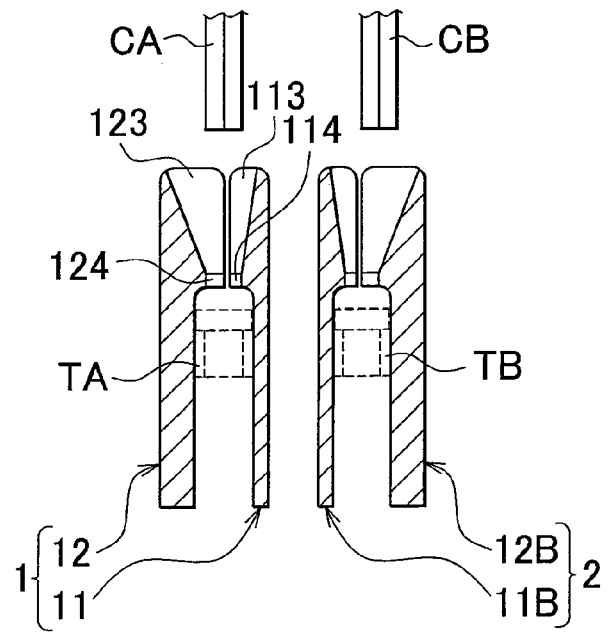
FIG. 5 is a diagram showing the first chuck member, the second chuck member, the terminals, and the coil terminals, according to the embodiment of the invention.
Figure 13:
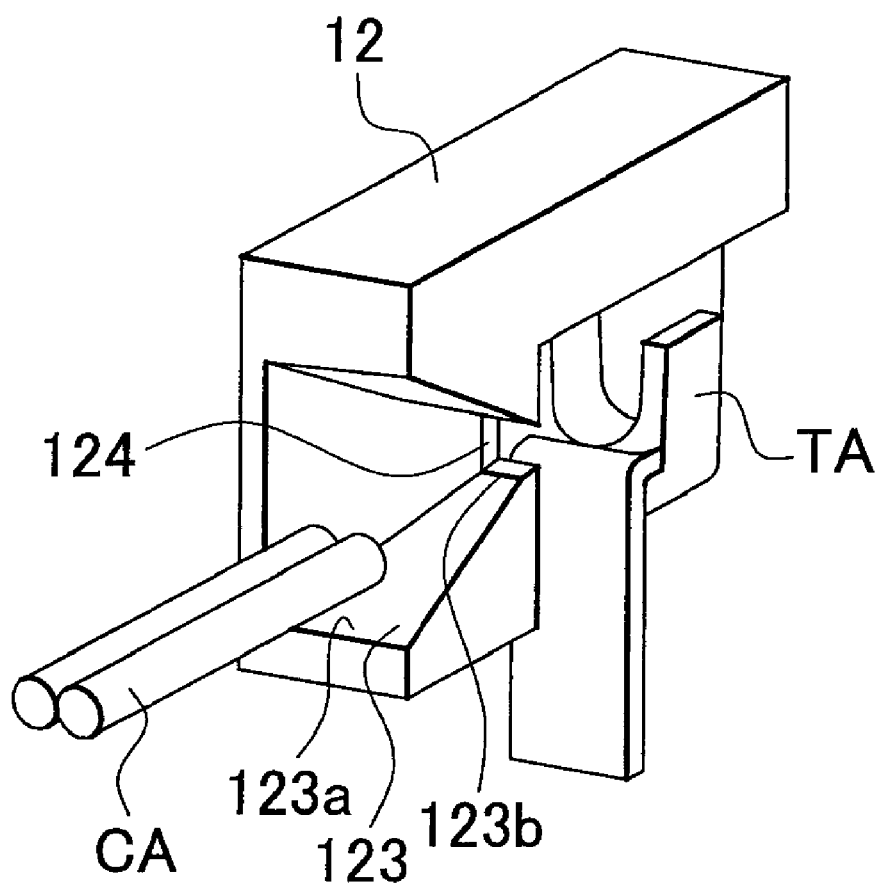
FIG. 13 is a perspective view showing a first chuck outer member, the terminal, and the coil terminal according to the embodiment of the invention.

The shape of the first chuck member 1 and the second chuck member 2 will be described with reference to FIG. 1 and FIG. 2. Because the first chuck member 1 and the second chuck member 2 have the same configuration, and are symmetric to each other, reference numerals for the second chuck member 2 are omitted in each of FIG. 1 and FIG. 2. Also, because the first chuck member 1 and the second chuck member 2 have the same configuration, and are symmetric to each other, only the configuration of the first chuck member 1 will be described. FIG. 5 is a plane view showing the first chuck member 1 and the second chuck member 2 in FIG. 1. To describe the first chuck inner member 11, numbers in the 110s are assigned to constituent portions of the first chuck inner member 11. To describe the first chuck outer member 12, numbers in the 120s are assigned to constituent portions of the first chuck outer member 12. FIG. 1 shows the first chuck member 1, the second chuck member 2, the terminals TA and TB, and the coil terminals CA and CB. As shown in FIG. 1, a guide portion 113 is formed in the first chuck inner member 11, and a guide portion 123 is formed in the first chuck outer member 12. As shown in FIG. 5, the guide portion 113 constitutes a guide passage that extends from a large inlet opening portion to an insertion hole 114. The cross section of the guide portion 113 gradually decreases from the inlet opening portion to the insertion hole 114. The guide portion 123 constitutes a guide passage that extends from a large inlet opening portion to an insertion hole 124. The cross section of the guide portion 123 gradually decreases from the inlet opening portion to the insertion hole 124. FIG. 13 is a perspective view showing the first chuck outer member 12, the terminal TA, and the coil terminal CA. Note that, in FIG. 13, the inlet opening portion and the insertion hole 124 have right-angle corners, to show the three-dimensional structure of the guide portion 123 in an easy-to-understand manner. Although FIG. 13 shows only the configuration of the first chuck outer member 12, the first chuck inner member 11 has the same configuration.

As shown in FIG. 1, when the first chuck inner member 11 and the second chuck inner member 12 are close to each other, the insertion holes 114 and 124, through which the two coil wires of the coil terminal CA are inserted, are positioned at a center of an area formed by combining the guide portions 113 and 123. The shape of the insertion holes 114 and 124 will be described with reference to FIG. 2. In FIG. 2, only the reference numerals required to describe the shapes of the insertion holes 114 and 124 are shown. A recessed portion is formed in an end portion of the first chuck inner member 11. The recessed portion is the insertion hole 114 through which the coil wires of the coil terminal CA are inserted. The insertion hole 114 will be described. A length from a vertical line 114d, which vertically extends from a most recessed portion 114a of the insertion hole 114, to a lower surface end portion 114c (hereinafter, referred to as "length N") is substantially equal to a half of the diameter of one coil wire of the coil terminal CA. A length from the vertical line 114d to an upper end portion 114b (hereinafter, referred to as "length O") is substantially equal to a length obtained by summing the diameter of one coil wire of the coil terminal CA and a length shorter than a half of the diameter of one coil wire of the coil terminal CA. In this case, the length O is longer than the length N. Because the width of the first chuck inner member 11 is larger than the length O, the width of the first chuck inner member 11 is not extremely small. Therefore, sufficient strength of the first chuck inner member 11 is maintained. This reduces the possibility that the first chuck inner member 11 is deformed by some trouble, and the possibility that the coil wires of the coil terminal CA are not smoothly guided.

Figure 14A:
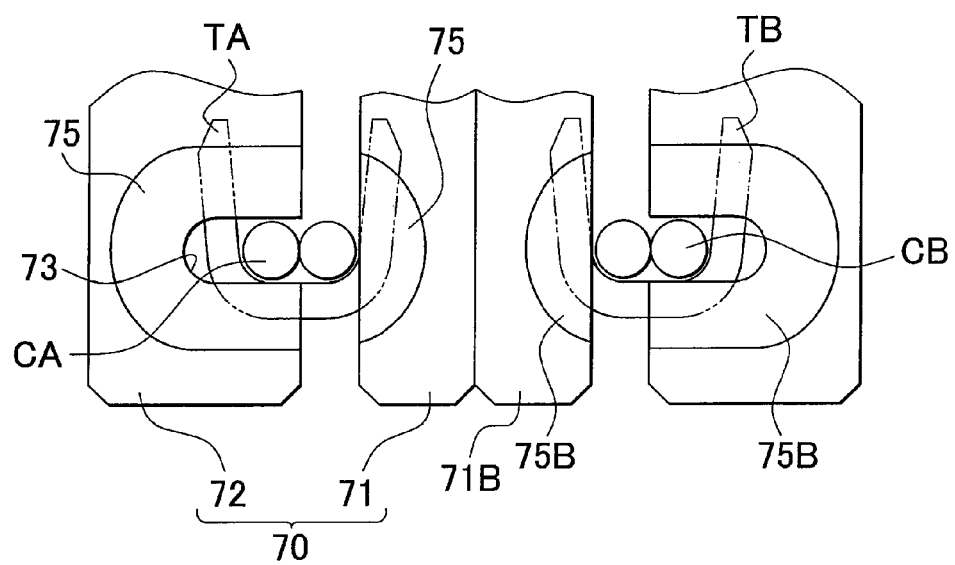
FIGS. 14A and 14B are diagrams each showing a first chuck member in a comparative example.
Figure 14B:
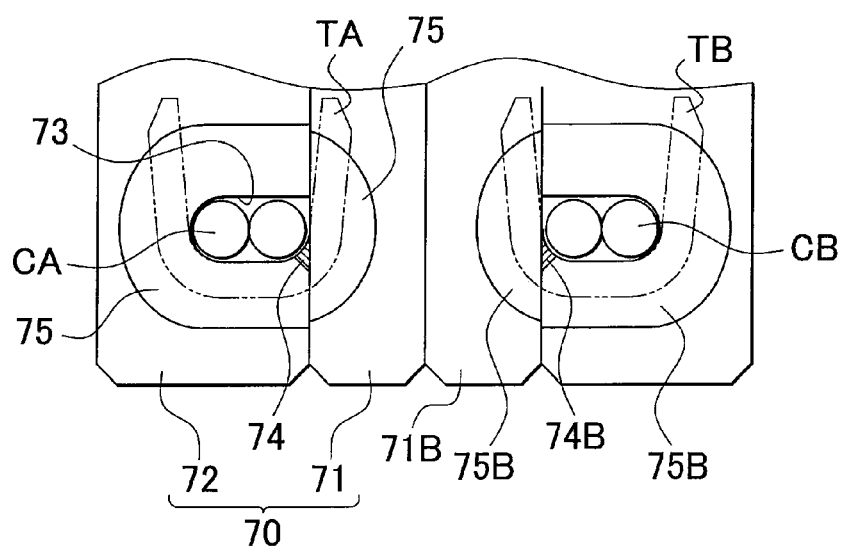
Figure 15A:
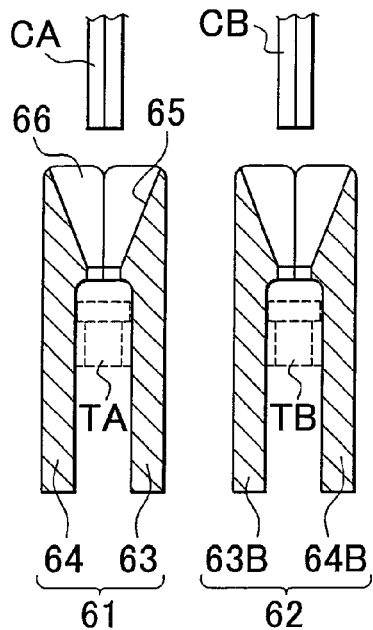
FIGS. 15A and 15B are plane views each showing a case where there is a long distance between coil terminals of a cassette coil, in related art.
Figure 15B:
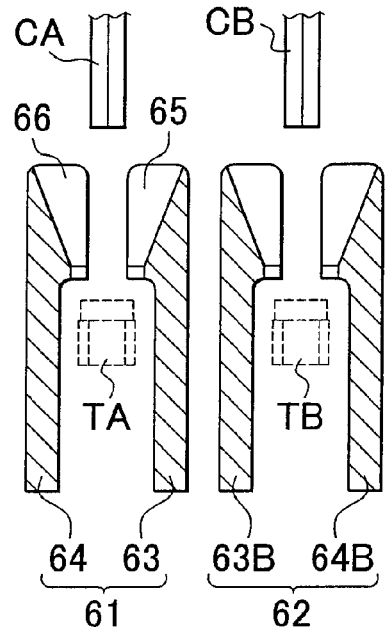
Figure 16A:
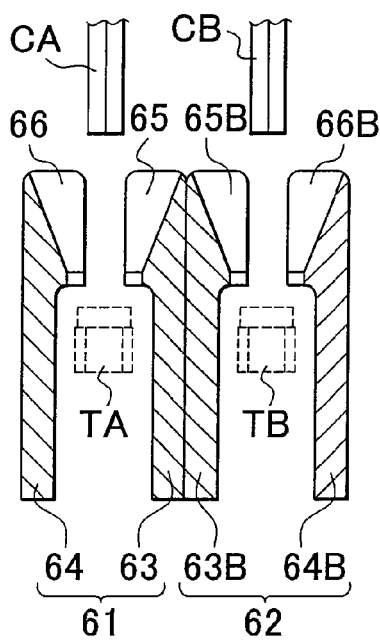
FIGS. 16A and 16B are diagrams each showing a first chuck member, a second chuck member, terminals, and the coil terminals, in the related art.
Figure 16B:
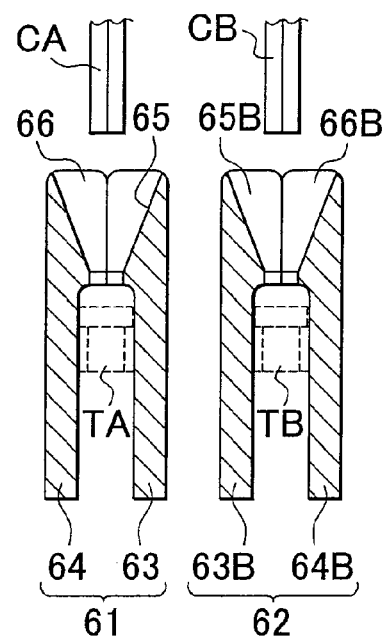
Figure 17:
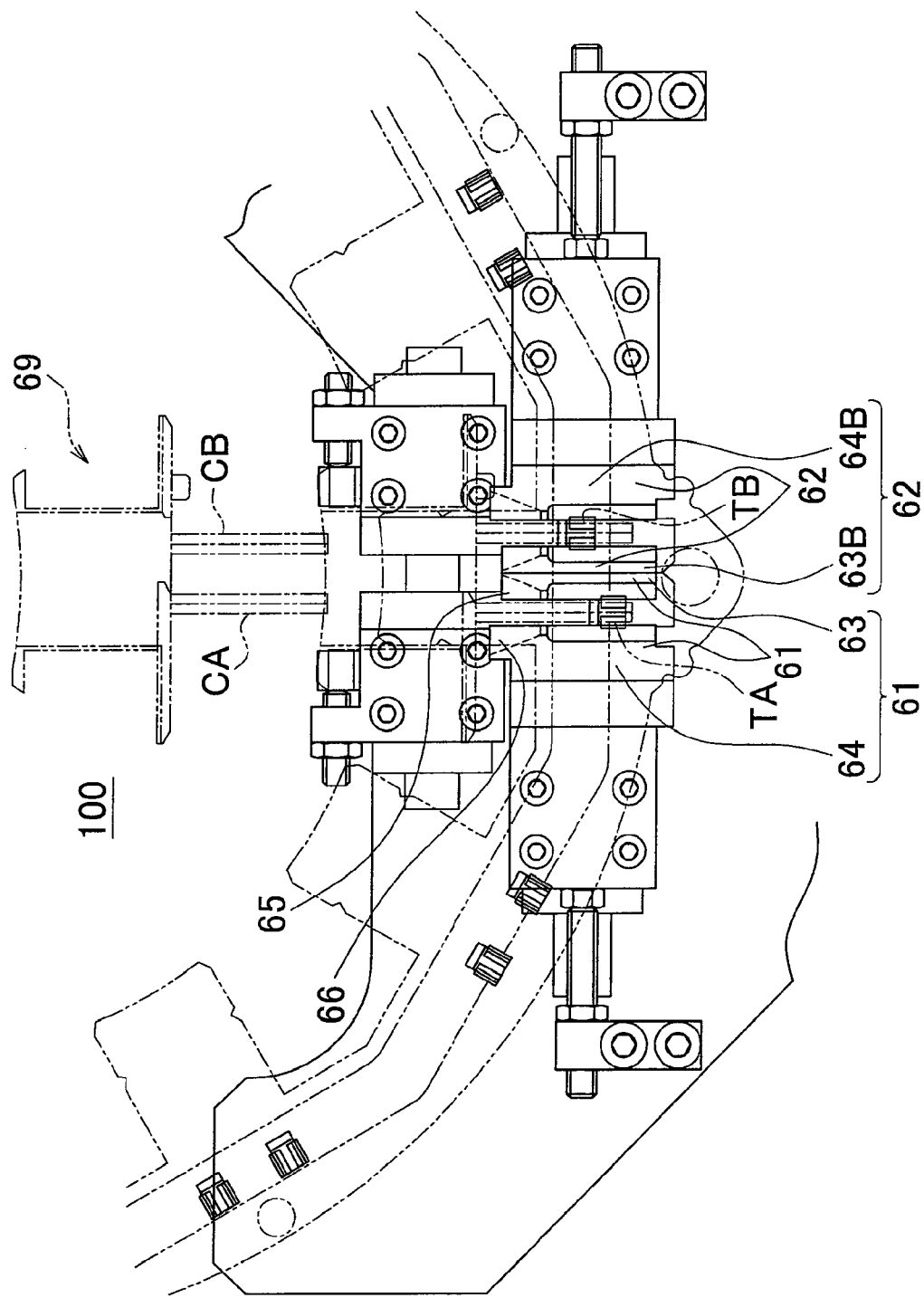
FIG. 17 shows a lead wire insertion device in the related art.

The insertion hole 124 will be described. A length from a vertical line 124d, which vertically extends from a most recessed portion 124a of the insertion hole 124, to a lower surface end portion 124c (hereinafter, referred to as "length M") is substantially equal to a length obtained by summing the diameter of one coil wire of the coil terminal CA and a length shorter than a half of the diameter of one coil wire of the coil terminal CA. A length from the vertical line 124 to an upper end portion 124b (hereinafter, referred to as "length L") is substantially equal to two-thirds of the diameter of one coil wire of the coil terminal CA. In this case, the length M is longer than the length L. Because the width of the first chuck outer member 12 is larger than the length M, the width of the first chuck outer member 12 is not extremely small. Therefore, sufficient strength of the first chuck outer member 12 is maintained. This reduces the possibility that the first chuck outer member 12 is deformed by some trouble, and the possibility that the coil wires of the coil terminal CA are not smoothly guided. When the first chuck inner member 11 and the first chuck outer member 12 are close to each other, an elliptical insertion hole, in which the two coil wires of the coil terminal CA can be inserted, is formed by the insertion hole 114 and the insertion hole 124. An edge of a lower portion of the insertion hole 114 and an edge of a lower portion of the insertion hole 124 extend along the shape of the terminal TA. Therefore, a gap, such as the gap 74 in FIG. 14B, is not formed between the edge of the lower portion of each of the insertion holes 114 and 124 and the edge of the terminal TA. This avoids the situation where the coil terminal CA is guided into a gap and interference between the coil terminal CA and the terminal TA occurs. Thus, when the coil terminal CA is inserted through the insertion hole 114 and the insertion hole 124, interference between the coil terminal CA and the terminal TA does not occur. Accordingly, it is possible to smoothly insert the coil terminal CA into the terminal TA.

Figure 3:
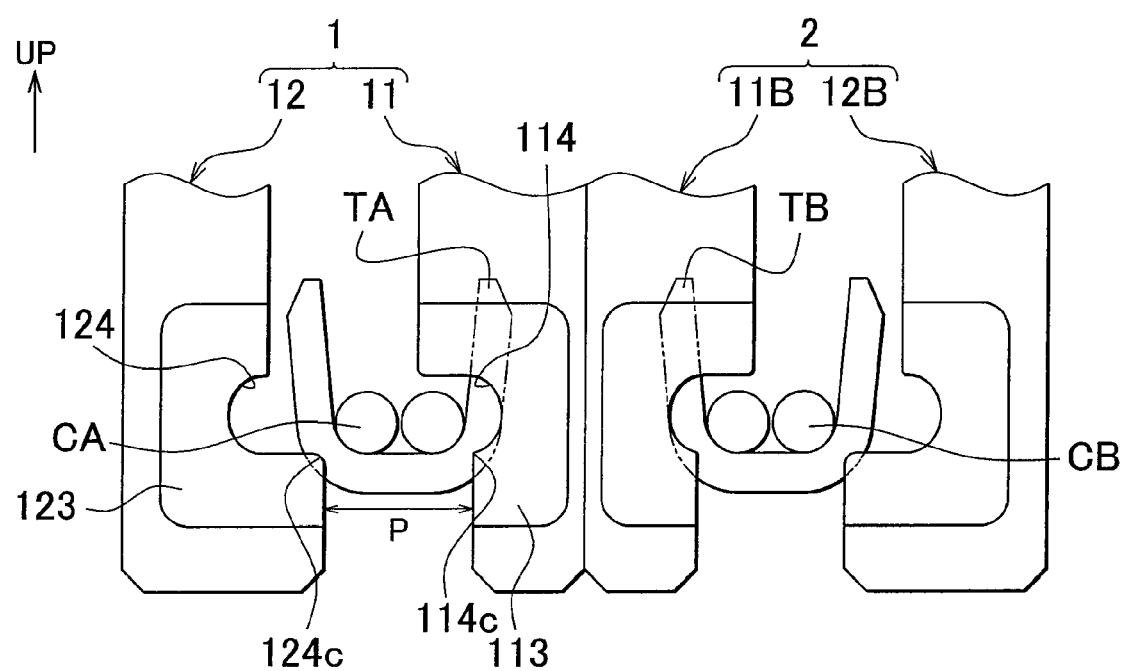
FIG. 3 is a diagram showing the first chuck member and the second chuck member in FIG. 1, which are opened.

FIG. 3 shows the chuck member 1 and the chuck member 2 that are opened. The first chuck inner member 11 and the second chuck inner member 11B are close to each other. There is a distance P between the lower surface end portion 114c of the insertion hole 114 of the first chuck inner member 11, and the lower surface end portion 124c of the insertion hole 124 of the first chuck outer member 12. The distance P is substantially equal to the sum of the diameters of the two coil wires of the coil terminal CA.

As shown in FIG. 7, a stopper portion 125 is fitted to a left end portion of a fitting portion 122. The stopper portion 125 determines the position of the first chuck outer member 12 when the first chuck member 1 is opened, by contacting a stopper screw 21 that is adjustably fitted to a stopper member 20 fixed to the body of the chuck device. Also, as shown in FIG. 8, a stopper screw 24 is adjustably fixed to a fitting portion 112 using a nut 26. The stopper screw 24 determines the position of the first chuck inner member 11 when the first chuck member 1 is opened, by contacting a stopper 25 that is formed integrally with the fitting portion 112. FIG. 9 shows the relation between the heights of the chuck device and the cassette coil 30. End portions of a coil 35 are bent at a right angle by right angle portions 36, and protrude. Thus, the end portions of the coil 35 function as the paired coil terminals CA and CB.

Figure 4:
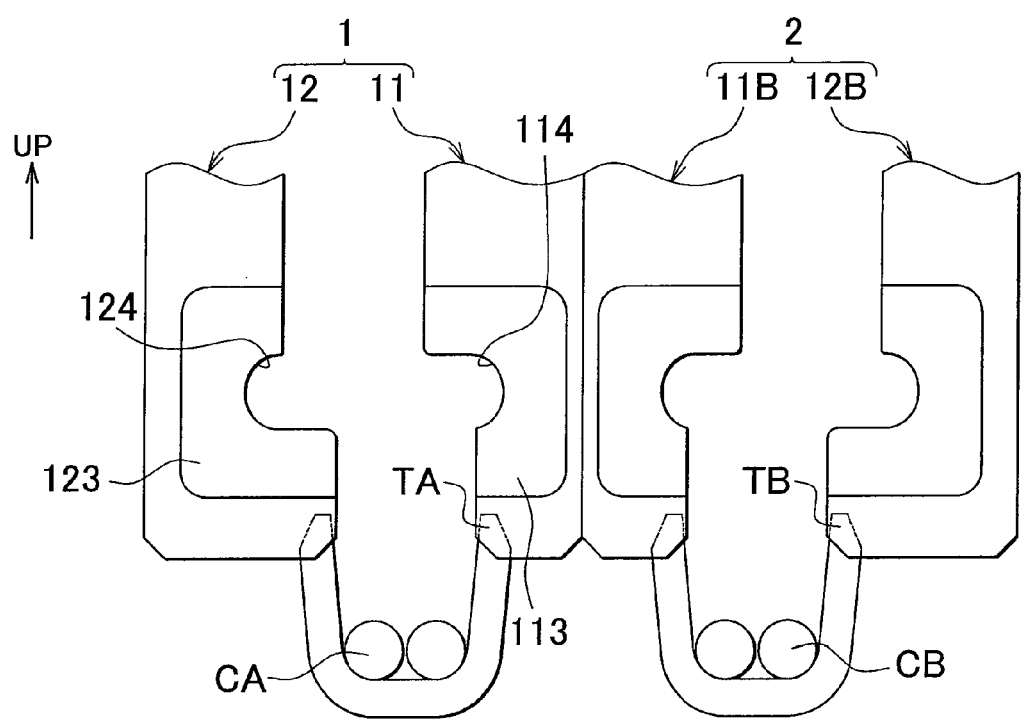
FIG. 4 is a diagram showing the first chuck member and the second chuck member in FIG. 3, which are moved upward.
Figure 6:
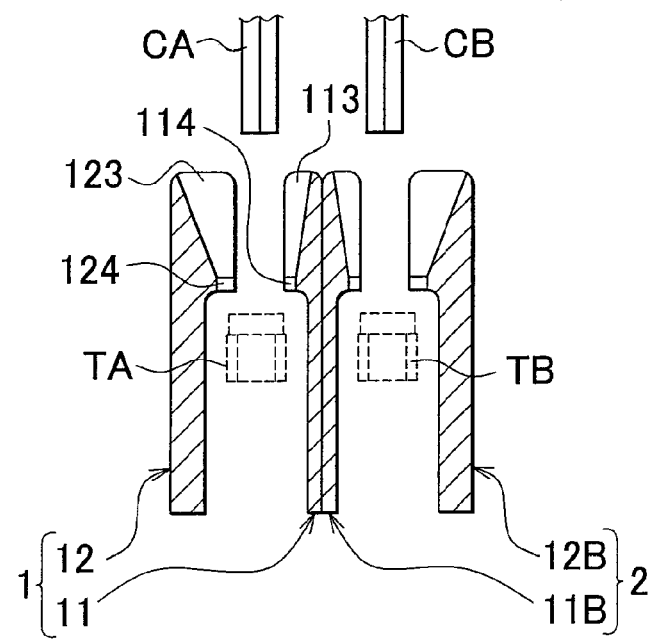
FIG. 6 is a diagram showing the first chuck member and the second chuck member that are opened, the terminals, and the coil terminals, according to the embodiment of the invention.

Next, the advantageous effects of the chuck device with the guide, which has the above-described configuration, will be described. Because the second chuck member 2 is symmetric to the first chuck member 1, only the advantageous effects of the first chuck member 1 will be described, and the description of the advantageous effects of the second chuck member 2 will be omitted. In a first station, the first chuck member 1 and the second chuck member 2 shown in FIG. 4 are moved downward to positions corresponding to the terminals TA and TB as shown in FIG. 3, using means (not shown) for moving the first chuck member 1 and the second chuck member 2 upward and downward. When the first chuck member 1 and the second chuck member 2 are moved downward, no air is supplied to the air cylinder 13 shown in FIG. 7, and therefore, the stopper portion 125 of the first chuck outer member 12 is in contact with the stopper screw 21 due to a force of a returning spring provided in the air cylinder 13, and the stopper screw 24 of the first chuck inner member 11 is in contact with the stopper 25 as shown in FIG. 8. Thus, the first chuck inner member 11 and the first chuck outer member 12 are constantly apart from each other by a predetermined distance, as shown in FIG. 6 and FIG. 8. FIG. 6 shows the first chuck member 1 and the second chuck member 2 that are opened, the terminals TA and TB, and the coil terminals CA and CB. When the chuck device with the guide is moved downward, the first chuck inner member 11 and the first chuck outer member 12 are apart from each other by the predetermined distance. Therefore, there is a sufficient gap between the first chuck inner member 11 and the terminal TA, and there is a sufficient gap between the first chuck outer member 12 and the terminal TA, as shown in FIG. 6. Accordingly, even if the position of the terminal TA varies, the first chuck inner member 11 and the first chuck outer member 12 do not hit the terminal TA, and thus, do not deform the terminal TA. Also, as shown in FIG. 6, the width of a portion of the first chuck inner member 11, which is positioned on the side of the terminal TA, is small, and the width of a portion of the second chuck inner member 11B, which is positioned on the side of the terminal TB, is small. Therefore, it is possible to make the first chuck member 1 and the second chuck member 2 close to each other. That is, even when the distance between the coil terminals CA and CB is short, it is possible to move the first chuck member 1 and the second chuck member 2 downward without deforming the terminals TA and TB.

Next, driving air for driving the air cylinder 13 is supplied to the air cylinder 13, by operating an electromagnetic valve (not shown). As a result, the rod 14 shown in FIG. 10 protrudes, and thus, the first chuck inner member 11 and the first chuck outer member 12 are simultaneously moved. Then, as shown in FIG. 5, one of the first chuck inner member 11 and the first chuck outer member 12, which contacts the terminal TA earlier than the other, stops at a position at which the one of the first chuck inner member 11 and the first chuck outer member 12 contacts the terminal TA. The other of the first chuck inner member 11 and the first chuck outer member 12 further moves, and then, stops so that the terminal TA is sandwiched between the first chuck inner member 11 and the first chuck outer member 12. FIG. 5 shows the first chuck member 1, the second chuck member 2, the terminals TA and TB, and the coil terminals CA and CB, which are extracted from FIG. 11. Thus, both of the first chuck inner member 11 and the first chuck outer member 12 are positioned with respect to the terminal TA. More specifically, the first chuck inner member 11 and the first chuck outer member 12 are fixed to the respective sliding members, and thus, the first chuck inner member 11 and the first chuck outer member 12 are able to move freely in a predetermined direction. Therefore, when the first chuck inner member 11 and the first chuck outer member 12 are close to each other, that is, the first chuck member 1 is closed, the first chuck inner member 11 and the first chuck outer member 12 are positioned with respect to the terminal TA. At this time, the pressure of the driving air supplied to the air cylinder 13 is set so that a chuck force is less than a value at which the terminal TA is not deformed. This reduces the possibility that the first chuck inner member 11 and the first chuck outer member 12 deform the terminal TA. Although only the left portion of the chuck device with the guide shown in each of FIG. 7 and FIG. 10 has been described, the second chuck inner member 11B and the second chuck outer member 12B are positioned with respect to the terminal TB in the same manner.

Next, while the chuck device with the guide is positioned with respect to the paired terminals TA and TB, the following operations are performed. That is, the supplied trapezoidal cassette coil 30 is fixed to a cassette coil chuck mechanism (not shown), and fitted to the connection terminal 50. The operations will be described in detail. The cassette coil 30 is moved toward the coil core 51a by means (not shown) for moving the cassette coil 30. Thus, the coil core 51a is fitted into a hollow hole 32 of the cassette coil 30. The coil terminal CA of the cassette coil 30 is guided into the insertion holes 114 and 124 by the guide portions 113 and 123. The coil terminal CB is guided in the same manner. Accordingly, even when the position of the coil terminal CA varies in a vertical direction and/or in a lateral direction, the coil terminal CA is reliably guided and inserted into the insertion holes 114 and 124 by the guide portions 113 and 123.

The position of the terminal TA varies, and the position of the coil terminal CA varies. Therefore, if the coil terminal CA tries to be simply inserted into the terminal TA, there is a high possibility that the coil terminal CA cannot be appropriately inserted into the terminal TA due to a synergistic adverse effect caused by the variation in the position of the terminal TA and the variation in the position of the coil terminal CA. However, in the chuck device with the guide according to the embodiment, the first chuck inner member 11 and the first chuck outer member 12 include the guide portions 113 and 123 that guide the coil terminal CA into the terminal TA, and the first chuck inner member 11 and the first chuck outer member 12 are positioned with respect to each terminal TA. Therefore, the guide portions 113 and 123 are positioned with respect to each terminal TA, although the position of the terminal TA varies. Thus, the synergistic adverse effect is not caused by the variation in the position of the terminal TA and the variation in the position of the coil terminal CA. Accordingly, by using the first chuck member 1, it is possible to reduce the probability that the coil terminal CA cannot be appropriately inserted into the terminal TA. Similarly, by using the second chuck member 2, it is possible to reduce the probability that the coil terminal CB cannot be appropriately inserted into the terminal TB. Also, when the first chuck inner member 11 is close to the first chuck outer member 12, the elliptical insertion hole, in which the two coil wires of the coil terminal CA can be inserted, is formed by the insertion hole 114 and the insertion hole 124. The edge of the lower portion of the insertion hole 114 and the edge of the lower portion of the insertion hole 124 extend along the shape of the terminal TA. Therefore, a gap, such as the gap 74 in FIG. 14B, is not formed between the edge of the lower portion of each of the insertion holes 114 and 124 and the edge of the terminal TA. This avoids the situation where the coil terminal CA is guided into a gap and interference between the coil terminal CA and the terminal TA occurs. Because interference between the coil terminal CA and the terminal TA does not occur when the coil terminal CA is inserted into the terminal TA, the coil terminal CA is smoothly inserted into the terminal TA.

Next, after the terminals TA and TB are released from the first chuck member 1 and the second chuck member 2, respectively, the first chuck member 1 and the second chuck member 2 are moved upward. First, when the first chuck member 1 and the second chuck member 2 are in the state shown in FIG. 1, the driving air is supplied to the air cylinder 13 by operating the electromagnetic valve (not shown) so that the first chuck inner member 11 and the first chuck outer member 12 of the first chuck member 1 are moved away from each other, and the second chuck inner member 11B and the second chuck outer member 12B of the second chuck member 2 are moved away from each other. Thus, the terminals TA and TB are released from the first chuck member 1 and the second chuck member 2, respectively, as shown in FIG. 3. At this time, the first chuck inner member 11 and the first chuck outer member 12 are moved away from each other so that there is the distance P between the first chuck inner member 11 and the first chuck outer member 12. The second chuck inner member 11B and the second chuck outer member 12B are moved away from each other so that there is the distance P between the second chuck inner member 11B and the second chuck outer member 12B. The distance P is equal to the sum of the diameters of the two coil wires of each of the coil terminals CA and CB. When the first chuck member 1 and the second chuck member 2 are moved upward and taken out, it is necessary to avoid interference between the first chuck member 1 and the coil terminal CA, and interference between the second chuck member 2 and the coil terminal CB. Therefore, the first chuck inner member 11 and the first chuck outer member 12 need to be moved away from each other so that there is the distance P between the first chuck inner member 11 and the first chuck outer member 12. The second chuck inner member 11B and the second chuck outer member 12B need to be moved away from each other so that there is the distance P between the second chuck inner member 11B and the second chuck outer member 12B. Each of the first chuck inner member 11 and the second chuck inner member 11B needs to be moved a distance N shown in FIG. 2. The distance N is shorter than the diameter of one coil wire of each of the coil terminals CA and CB. Therefore, each of the first chuck inner member 11 and the second chuck inner member 11B needs to be moved the short distance. Accordingly, even when the distance between the coil terminals CA and CB is short, a sufficient chuck stroke is ensured, that is, each of the first chuck inner member 11 and the second chuck inner member 11B can be sufficiently moved. Thus, it is possible to make the first chuck member 1 and the second chuck member 2 close to each other.

Next, the first chuck member 1 and the second chuck member 2, which are in the states shown in FIG. 3, are moved upward by means (not shown) for moving the first chuck member 1 and the second chuck member 2 upward and downward. Thus, the first chuck member 1 and the second chuck member 2 are brought to the states shown in FIG. 4. At this time, there is the distance P between the first chuck inner member 11 and the first chuck outer member 12, and the distance P is equal to the sum of the diameters of the two coil wires of the coil terminal CA. Therefore, when the first chuck member 1 is moved upward, the insertion holes 114 and 124 do not contact the coil terminal CA. Accordingly, the first chuck member 1 does not deform the coil terminal CA. The second chuck member 2, which is symmetric to the first chuck member 1, has the same advantageous effects as the above-described advantageous effects of the first chuck member 1.

Next, an index is rotated, and the coil core portion, to which the cassette coil 30 is fitted, is brought to a second station. In the second station, the terminals TA and TB are crimped by a crimping device (not shown) that includes upper and lower crimping dies. Thus, the terminals TA and TB are electrically connected to the coil terminals CA and CB. In the connection terminal 50, first, the six trapezoidal cassette coils are fitted to every other coil core 51a. Then, the six rectangular parallelepiped cassette coils are sequentially fitted to the coil cores 51a. When the trapezoidal cassette coils are fitted, and when the rectangular parallelepiped cassette coils are fitted, the terminals TA and TB are positioned using the chuck device with the guide, and then, the coil terminals CA and CB are inserted into the terminals TA and TB, respectively, using the positioned guide portions.

As described above, (1) the lead wire insertion device according to the embodiment includes a pair of the first chuck member 1 and the second chuck member 2, each of which is separable. The first chuck member 1 and the second chuck member 2 connect the coil terminals CA and CB of the cassette coil to the terminals TA and TB of the connection terminal 50. The first chuck inner member 11 is adjacent to the second chuck inner member 11B. The first chuck member 1 is divided into the first chuck inner member 11 and the first chuck outer member 12 at a division position, the division position is inside the both ends of the cross section of the coil terminal CA in the lateral direction of the first chuck member 1, and the division position is offset from the center of the cross section of the coil terminal CA in the lateral direction of the first chuck member 1. The second chuck member 2 is divided into the second chuck inner member 11B and the second chuck outer member 12B at a division position, the division position is inside the both ends of the cross section of the coil terminal CB in the lateral direction of the second chuck member 2, and the division position is offset from the center of the cross section of the coil terminal CB in the lateral direction of the second chuck member 2. Therefore, even when the distance between the coil terminals is short, the stroke of the first chuck inner member 11 of the first chuck member 1 and the stroke of the second chuck inner member 11B of the second chuck member 2 are not limited, and thus, a sufficient chuck stroke is ensured. That is, the first chuck inner member 11 and the second chuck inner member 11B can be sufficiently moved. In other words, even when the distance between the coil terminal CA and the coil terminal CB is short, it is possible to reduce the possibility that an adverse effect is caused due to the limitation of the stroke of the first chuck inner member 11 and the stroke of the second chuck inner member 11B. Also, a gap is not formed between the edge of the lower portion of the insertion hole through which the coil terminal is inserted, and the edge of the terminal TA when the first chuck inner member 11 and the first chuck outer member 12 are close to each other. Therefore, it is possible to smoothly insert the coil terminals CA and CB into the terminals TA and TB, respectively.

(2) In the lead wire insertion device described in (1), the upper portion of the first chuck inner member 11 is separated from the upper portion of the first chuck outer member 12 at an upper division position, and the upper division position is outwardly offset from the center of the cross section of the coil terminal CA in the lateral direction of the first chuck member 1. The upper portion of the second chuck inner member 11B is separated from the upper portion of the second chuck outer member 12B at an upper division position, and the upper division position is outwardly offset from the center of the cross section of the coil terminal CB in the lateral direction of the second chuck member 2. Therefore, each of the first chuck inner member 11 and the second chuck inner member 11B has sufficient strength, while a sufficient chuck stroke is ensured. This reduces the possibility that the coil terminal cannot be appropriately guided due to the deformation of the chuck inner member.

The invention is not limited to the above-described embodiment. Modifications may be appropriately made to a part of the configuration within the scope of the invention.

What is claimed is:
1. A lead wire insertion device comprising:
  a pair of a first chuck member and a second chuck member, each of which has an insertion hole through which a coil terminal of a cassette coil is inserted, to connect the coil terminal to a terminal of a connection terminal, and each of which is separable and is divided into a chuck inner member and a chuck outer member, wherein:
  the first chuck member and the second chuck member are bilaterally symmetrically arranged;

the chuck inner member of the first chuck member and the chuck inner member of the second chuck member are bilaterally symmetrically arranged and are adjacent to each other;

a division position between the chuck inner member and the chuck outer member is inside the insertion hole, and is offset from a center of the insertion hole;

a division position between an upper portion of the chuck inner member, which is located above the insertion hole, and an upper portion of the chuck outer member, which is located above the insertion hole, is offset from a center of the coil terminal toward the chuck outer member; and a division position between a lower portion of the chuck inner member, which is located below the insertion hole, and a lower portion of the chuck outer member, which is located below the insertion hole, is offset from the center of the coil terminal toward a side opposite to the chuck outer member.

* * * * *